(12) United States Patent
Rasras

(10) Patent No.: US 6,934,446 B2
(45) Date of Patent: Aug. 23, 2005

(54) OPTICAL WAVEGUIDING APPARATUS HAVING REDUCED CROSSOVER LOSSES

(75) Inventor: Mahmoud Rasras, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 22 days.

(21) Appl. No.: 10/400,840

(22) Filed: Mar. 27, 2003

(65) Prior Publication Data

US 2004/0190830 A1 Sep. 30, 2004

(51) Int. Cl.[7] .............................. G02B 6/26; G02B 6/42
(52) U.S. Cl. ............................ 385/39; 385/14; 385/15; 385/31; 385/43; 385/129
(58) Field of Search ........................... 385/1–3, 14–16, 385/27–31, 39–46, 50, 129–132

(56) References Cited

U.S. PATENT DOCUMENTS

| | | | |
|---|---|---|---|
| 4,961,619 A | | 10/1990 | Hernandez-Gil et al. 350/96.12 |
| 4,998,793 A | * | 3/1991 | Henry et al. ................... 385/1 |
| 5,157,756 A | | 10/1992 | Nishimoto ................... 385/129 |
| 5,574,808 A | | 11/1996 | van der Tol ................... 385/28 |
| 5,577,141 A | * | 11/1996 | Adar et al. ..................... 385/43 |
| 5,581,642 A | * | 12/1996 | Deacon et al. ................. 385/15 |
| 5,818,989 A | * | 10/1998 | Nakamura ..................... 385/45 |
| 5,894,535 A | * | 4/1999 | Lemoff et al. ................. 385/47 |
| 6,198,860 B1 | | 3/2001 | Johnson et al. ............... 385/28 |
| 6,404,957 B1 | * | 6/2002 | Shin et al. ..................... 385/45 |

FOREIGN PATENT DOCUMENTS

| | | | |
|---|---|---|---|
| EP | 0 415 386 A2 | 3/1991 | ............ G02B/6/28 |
| EP | 0 877 264 A2 | 11/1998 | ........... G02B/6/293 |

OTHER PUBLICATIONS

Weissman and Hendel "Analysis of Periodically Segmented Waveguide Mode Expanders" Journal of Lightwave Technology, vol. 13, No. 10; Oct. 1995; pp. 2053–2058.
Li and Burke "Linear Propagation Characteristics of Periodically Segmented Waveguides" Optics Letters, vol. 17, No. 17; Sep. 1, 1992; pp. 1195–1197.
K. Aretz, et al. "Reduction of Crosstalk and Losses of Intersecting Waveguide" Electronics Letters; May 25, 1989; vol. 25, No. 11, p. 730.
H. G. Bukkems, et al. "Minimization of the Loss of Intersecting Waveguides in InP–Based Photonic Integrated Circuits" IEEE Photonics Technology Letters, vol. 11, No. 11, Nov. 1999; pp. 1420–1422.

* cited by examiner

*Primary Examiner*—Brian Healy
*Assistant Examiner*—Ryan Lepisto

(57) ABSTRACT

The invention is an improved planar waveguide device comprising a plurality of optical waveguides and one or more crossover regions where two waveguides intersect at an angle. In accordance with the invention, loss and crosstalk produced by the crossover are reduced by segmenting the waveguides across the region of intersection. Advantageously, the segments are also enlarged in width (as compared to transmission regions of the waveguide remote from the crossover) and offset with respect to the longitudinal axis of the waveguide. In regions where the segments intersect, they merge into a complex segment having a shape corresponding to the periphery of the segment intersection.

14 Claims, 3 Drawing Sheets

OPTICAL WAVEGUIDING APPARATUS HAVING REDUCED CROSSOVER LOSSES

FIELD OF THE INVENTION

This invention relates to optical waveguiding apparatus, such as integrated optical waveguide devices, and, in particular, to such apparatus comprising waveguide crossovers of reduced loss.

BACKGROUND OF THE INVENTION

As optical fiber communication channels increasingly replace metal cable and microwave transmission links, optical waveguiding apparatus in the form of integrated optical waveguide devices become increasingly important. Such devices typically comprise a substrate, such as silicon, provided with a cladding base layer such as $S_iO_2$, a thin patterned core layer over the base, and a top cladding layer over the patterned core. The core has a higher refractive index than the cladding layers to provide waveguiding properties, and the core layer is configured, as by photolithographic techniques, to perform any one of a wide variety of optical processing functions such as beam splitting, tapping, multiplexing, demultiplexing and filtering.

With the advent of higher transmission rates and increasing levels of wavelength division multiplexing, it has become desirable to provide waveguiding apparatus with an increasing density of processing devices operating on an increasing number of optical inputs. Compact design of such apparatus requires waveguide "crossovers" where one guided beam crosses another. Typically the waveguiding core regions do not physically cross over on different planes, but rather pass through the same coplanar region.

A difficulty with waveguide crossovers is that they engender optical loss through scattering and cross talk as some light from each path goes to the other. The intersecting waveguides present an asymmetric index profile at the crossing. This profile disturbs the guided optical mode and excites higher order optical modes. Since the intersection region is abrupt (non-adiabatic), it will excite non-guided modes, resulting in crosstalk and the loss of optical power. These problems are aggravated as the waveguide index contrast $\delta$ increases.

FIG. 1A, which is prior art, schematically illustrates a conventional crossover comprising a pair of core optical waveguides 10 and 11 intersecting at an angle $\emptyset$ in a common core layer over a region 12. The core waveguides 10, 11 have an index of refraction $n_2$ higher than the index $n_1$ of the surrounding cladding layers. For high density apparatus, the crossovers typically intersect at a small angles $\emptyset < 5°$ and have cores presenting a high index contrast to the cladding, i.e. a high value of delta=$(n_2-n_1)/n_2$. But even with low index contrast, propagating optical modes are disturbed by the intersection region, exciting non-guided modes that cause loss of optical power and crosstalk.

FIG. 1B is a graphical illustration showing optical power loss as a function of the crossing angle $\emptyset$ for typical conventional crossovers having delta=4% (curve 1) and delta=0.8% (curve 2). It is clear that loss increases rapidly as the crossing angle decreases.

Many techniques have been proposed for reducing losses at the waveguide crossing. One approach is to up-taper the guiding layer to increase its width as the waveguides approach the intersecting region. (See K. Aretz et al., "Reduction of crosstalk and losses of intersecting waveguide," 25 *Electronics Letters*, No. 11 (May 25, 1989); see also H. G. Bukkens, et al., "Minimization of the Loss of Intersecting Waveguides in $I_nP$-Based Photonic Integrated Circuits," *IEEE Photonics Technology Letters*, No. 11 (November 1999)). The optical beam size, therefore, expands at the crossing, which makes a better matching of the optical mode to the waveguide at the other side of the crossing. Low crosstalk of >30 dB and low loss were achieved for angles >6°. However, this technique requires very long tapering length (>1 mm), which is impractical for certain applications. Also, the technique is not effective for high delta waveguide crossings.

A similar approach is proposed by Hernandez et al. in U.S. Pat. No. 4,961,619 issued Oct. 9, 1990. The width of the waveguide is increased or decreased at the crossing junction to modify the optical mode characteristics in that region. This introduces an axial variation in the transverse index of refraction distribution, which allows for better alignment of the electrical field at the crossing. The method can also be used for small angle crossing below 5°. However, it is not very suitable for high delta waveguide since it requires large tapering regions to adiabatically expand the optical mode.

In a third approach by Nishimoto (U.S. Pat. No. 5,157,756 issued Oct. 20, 1992), the index of the intersecting region includes a peripheral region of low index surrounding an island of waveguide material at the center of the crossing. See also Lemoff, et al. This technique could reduce the losses for small angle crossing. However, it is not effective for high step index contrast waveguides, and the loss is expected to be higher.

Accordingly, there is a need for optical waveguiding apparatus having waveguide crossovers of reduced loss.

SUMMARY OF THE INVENTION

The invention is an improved planar waveguide device comprising a plurality of optical waveguides and one or more crossover regions where two waveguides intersect at an angle. In accordance with the invention, loss and crosstalk produced by the crossover are reduced by segmenting the waveguides across the region of intersection. Advantageously, the segments are also enlarged in width (as compared to transmission regions of the waveguide remote from the crossover) and offset with respect to the longitudinal axis of the waveguide. In regions where the segments intersect, they merge into a complex segment having a shape corresponding to the outer periphery of the segment intersection.

BRIEF DESCRIPTION OF THE DRAWINGS

The advantages, nature and various additional features of the invention will appear more fully upon consideration of the illustrative embodiments how to be described in detail in connection with the accompanying drawings. In the drawings.

It is to be understood that these drawings are for purposes of illustrating the concepts of the invention and, except for the graphs, are not to scale.

DETAILED DESCRIPTION

Figure 1A:
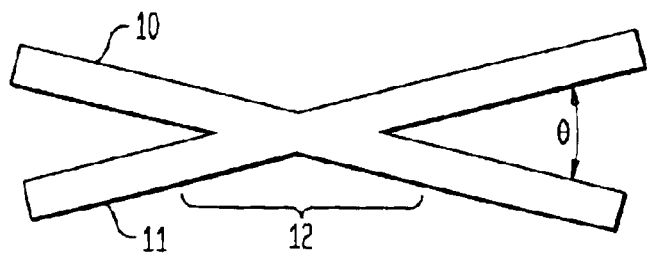
FIG. 1A is a schematic diagram of a conventional waveguide crossover.
Figure 1B:
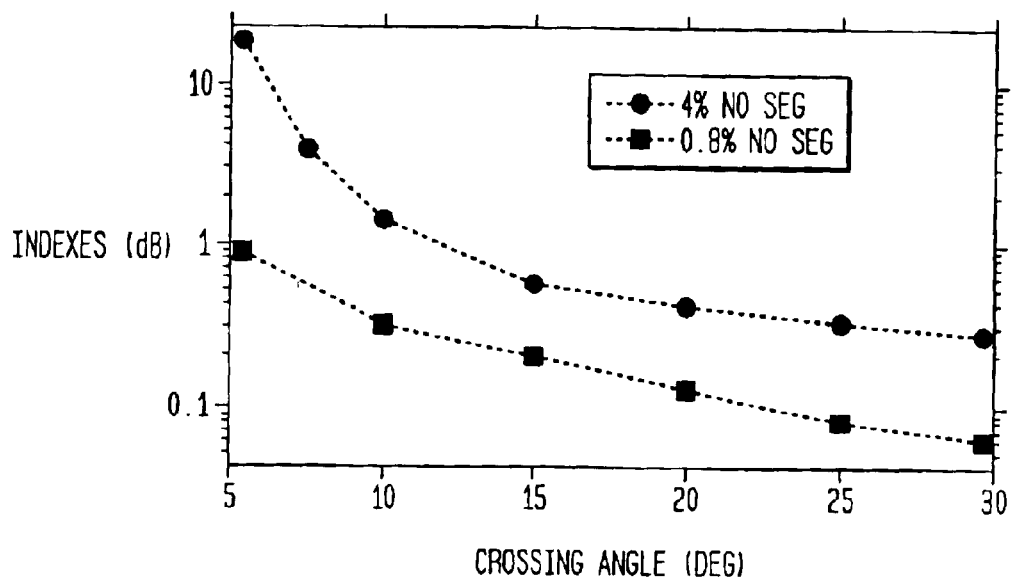
FIG. 1B is a graphical illustration of simulated loss as a function of crossing angle for two representative crossovers according to FIG. 1A.

Referring to the drawings, FIGS. 1A and 1B, which are conventional, were described in the Background of the Invention.

Figure 2A:
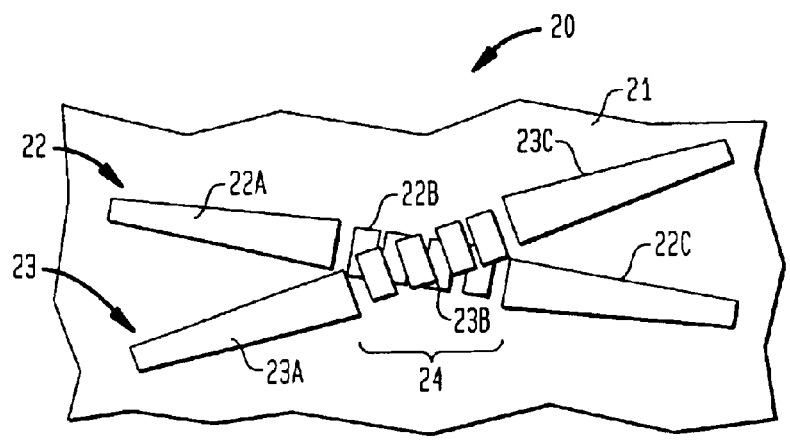
FIG. 2A is a schematic diagram useful in designing a waveguide crossover in accordance with the invention.

FIG. 2A, which is useful in designing a waveguide crossover in accordance with the invention, illustrates an optical waveguide apparatus 20 comprising an exemplary waveguide crossover region 21. In essence, the crossover region 21 comprises a pair of co-planar optical waveguides 22 and 23 intersecting at an angle $\emptyset$. Each optical waveguide 22, 23 comprises a core section including a plurality of segments 22B, 23B which the waveguides share across an intersection region 24. Advantageously each waveguide 22, 23 is adiabatically tapered to enlarged width at the intersection region and adiabatically tapered to reduced width leading out of the region. Waveguide 22, for example provides a path comprising continuous tapered input core section 22A of expanding width leading into the intersection region 24, the plurality of segments 22B in the region 24, and a continuous tapered core section 22C, leading out of the region 24. Waveguide 23 has similar core sections similarly designated. Preferably in each waveguide, the segments are, transversely offset from the axes of the continuous input sections 22A, 23A.

FIG. 2A might be possible for a crossover where waveguide cores 22 and 23 are in separate layers, but it does not hold for crossovers where cores 22, 23 are coplanar. As can readily be seen from FIG. 2A, in an apparatus with coplanar cores, segments 22B and 23B will merge into a complex common segment having a shape corresponding to the outer periphery of the segment intersections. In accordance with the invention, a crossover comprises a crossover including such a complex common segment.

Figure 2B:
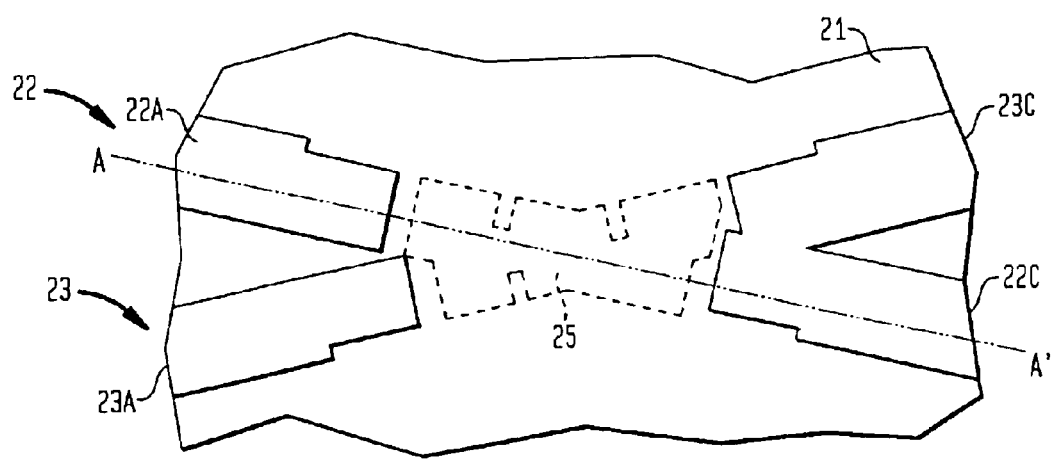
FIG. 2B is a schematic diagram illustrating an exemplary optical waveguiding apparatus comprising a waveguide crossover in accordance with the invention.

FIG. 2B illustrates an exemplary optical apparatus including a crossover in accordance with the invention. Here coplanar waveguiding core 22, 23 pass through a crossover region 21. Each waveguide comprises a continuous (long compared to the crossover region) input section, e.g. 22A, 23A, a complex common segment 25 (shown essentially by the dashed line), and a continuous output section, e.g. 22C, 23C. Both waveguides have the same complex common segment 25, and the complex common segment 25 has a shape corresponding to the outer periphery of merged segments as described in connection with FIG. 2A. The apparatus of FIG. 2B advantageously also includes the tapers and offsets described in connection with FIG. 2A.

Figure 2C:
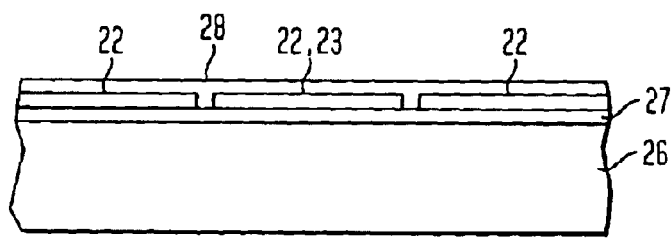
FIG. 2C is a schematic cross section of the FIG. 2B device along waveguide 22.

FIG. 2C is a schematic cross section of the FIG. 2B device along the line A–A'. It shows that the apparatus comprises a substrate 26 such as silicon supporting a first cladding layer 27 such as silica. The core layers 22, 23 are typically regions of silica doped for higher refractive index and a second cladding layer 28 can be deposited over the patterned core.

The crossover angle θ, is the acute angle between the longitudinal axes of waveguides 22 and 23. The invention is applicable for crossovers with θ typically in the range 35–3° and preferably in the range 25–5°. As compared with the typical waveguide width in transmission regions remote from the crossover region, the waveguides in the crossover region are enlarged typical by 0–30% and preferably 9–11%. The crossover region typically comprises the merger of 3–5 common segments. Each segment typically has a longitudinal extent in the range 4–8 micrometers, and the segments are spaced apart by 1.2 to 1.4 micrometers. In an advantageous embodiment, the segmented sections are transversely offset from both the input core sections and the output core sections. The optimal offsets depend on the angle θ. For typical crossovers, the offset can range from less than about 0.1 micrometer to more than 1.0 micrometer, with an advantageous offset of 0.3 micrometer for θ=20°, and 0.7 micrometer for θ=5°. In the embodiment of FIG. 2 the segmented sections 25B are offset with respect to the input section 23A (shifted left) and with respect to input section 22A (shifted right).

The invention is useful for crossovers of waveguides having deltas in the 0.8–10 range. It is particularly advantageous for crossovers having high deltas in the 2–6 range. In the above-described crossover, the overlap of the segments from the intersecting waveguides generates an index pattern that guides optical power in the direction of the output waveguides. The segmented sections expand the optical beam within the intersection region 24. In addition, the beam is slightly expanded with adiabatic (preferably exponential) tapers to match the optical mode in the segmented region. The transverse offset of the segments improves mode coupling at the waveguide intersection region 24.

The invention can now be more clearly understood by consideration of the following specific examples.

Figure 3:
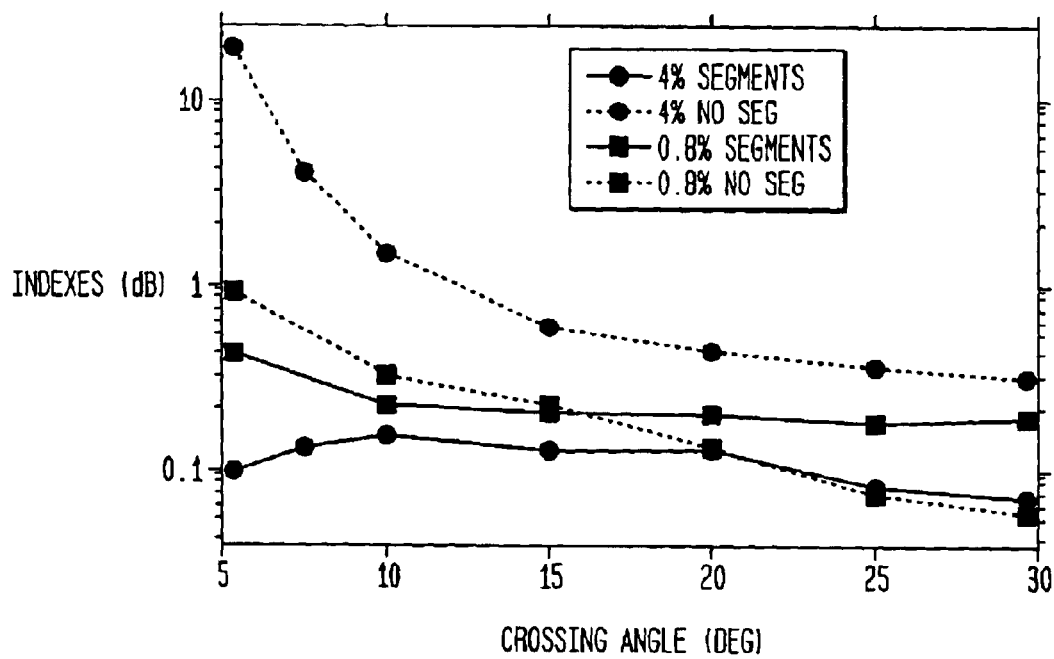
FIG. 3 is a graphical illustration of simulated loss as a function of crossing angle for several crossovers including the crossover of FIG. 2B.

FIG. 3 shows a simulation results using BPV commercial software. These results are obtained for delta=0.8% (circle), 4% (square) index contrast waveguides. On the same figure, the data from conventional crossing are shown by the dotted lines. For the 0.8% waveguide, the starting width of the taper is 4.5 $\mu$m and height of 6.4 $\mu$m. The final width can range from 4 to 5 $\mu$m, depending on the angle of crossing. The total length of the crossing area (tapers included) is 120 $\mu$m. The offsets of the waveguides are adapted for each angle. As demonstrated in this figure, significant reduction in loss for small angle crossings could be obtained compared to the conventional crossing. Without using segments, the loss in standard delta waveguide (0.8%) is about 0.08 db at 30°. For smaller angle crossing of 5°, this value could increase up to 1 dB, which is too high for acceptable loss. Using our new technique, this value is reduced to 0.1 db for angle of 5° and the results are nearly flat for broad range of angles.

For 4% delta waveguides, the dimensions are 2.7×2.7 $\mu$m$^2$. The taper final length ranges between 70–120 $\mu$m. Again, the offset and the final width of the waveguide are adapted according to the crossing angles. Using segmentation at the crossing could reduce the losses from 0.45 db to 0.13 db for 20° and from ~16 db to 0.4 db for 5°. The ~16 db value is due mainly to crosstalk with the intersecting waveguide. These results are very promising for low angle intersection, which will increase the number of optical devices on one chip.

It is understood that the above-described embodiments are illustrative of only a few of the many possible specific embodiments, which can represent applications of the invention. Numerous and varied other arrangements can be made by those skilled in the art without departing from the spirit and scope of the invention.

What is claimed is:

1. An optical device comprising a plurality of optical waveguides, each waveguide comprising a longitudinally extending core region for guiding light, the device further comprising at least one intersection region wherein at least first and second waveguides intersect, the first and second waveguides in the intersection region comprising respective segmented core regions which merge into at least one common intersecting segment.

2. The device of claim 1 wherein each segmented core region in the absence of merger has a longitudinal extent in the range 4–8 micrometers.

3. The device of claim 1 wherein the segmented core regions in the absence of merger are spaced apart by a gap having a longitudinal extent in the range 1.2 to 1.4 micrometers.

4. The device of claim 1 wherein each of the first and second waveguides comprise a pair of continuous sections separated from the intersection region.

5. The device of claim 4 wherein each continuous section comprises a portion continuously tapered in width toward the intersection region.

6. The device of claim 5 wherein the portion continuously tapered is adiabatically tapered.

7. The device of claim 4 wherein each of the segmented core regions for each of the waveguides is transversely offset from an optical axix of the continuous sections.

8. The device of claim 7 wherein the offset is in the range 0.1–1.0 micrometer.

9. The device of claim 1 wherein the segmented core regions in the absence of merger comprises 3 to 5 segments across the intersection region.

10. The device of claim 1 wherein the angle of intersection between the first and second waveguides is in the range 3 to 35°.

11. The device of claim 1 wherein the angle of intersection between the first and second waveguides is in the range 5–25°.

12. The device of claim 1 wherein each of the first and second waveguides has an index contrast in the range 2 to 6.

13. The device of claim 1 wherein the common intersecting segment has a shape corresponding to an outer periphery of the segmented core regions.

14. An intersection region of at least two waveguides, each waveguide comprising a longitudinally extending core region for guiding light, comprising:

a common intersecting segment having a shape corresponding to an outer periphery of merged segmented core regions of the at least two waveguides.

* * * * *